Feb. 3, 1931.                A. T. KATHNER                 1,791,166
                       DISK OR WHEEL FOR CONVEYERS
                           Filed Jan. 31, 1927
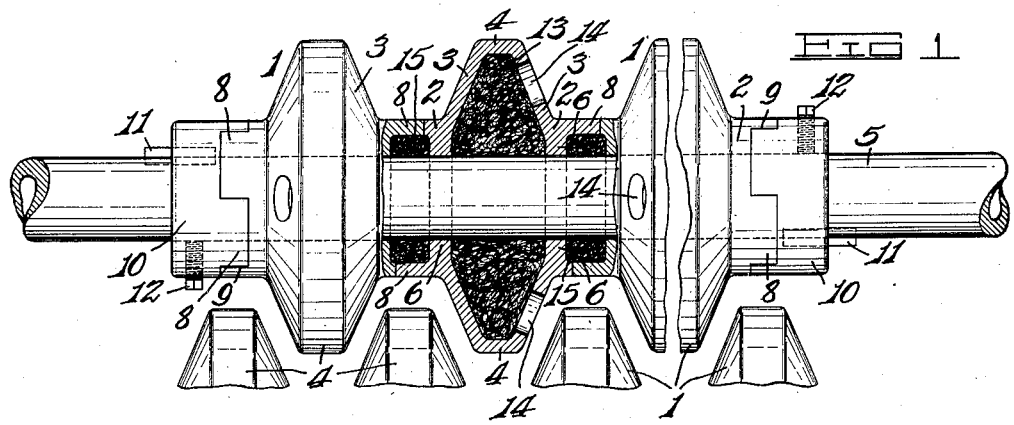
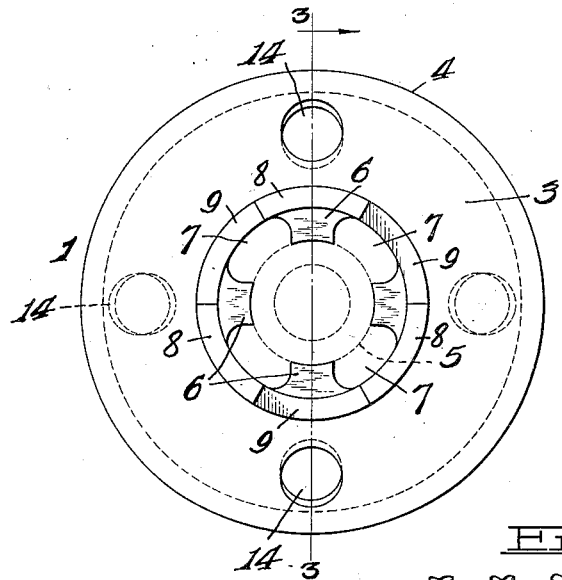
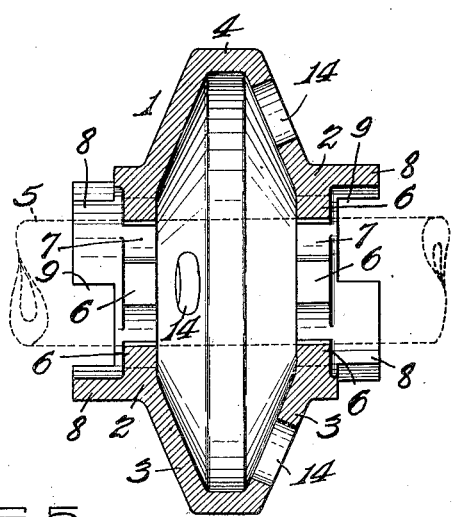
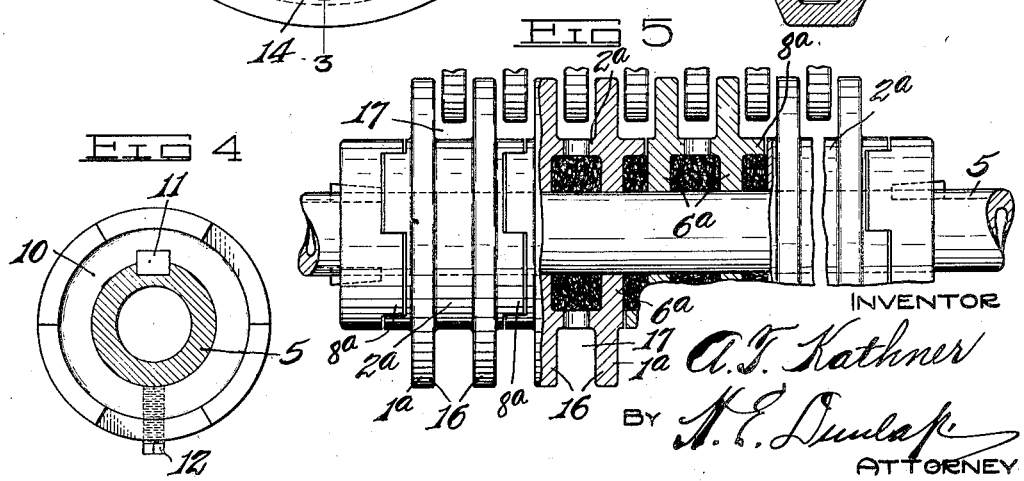
INVENTOR
A. T. Kathner
BY N. E. Dunlap
ATTORNEY Patented Feb. 3, 1931

1,791,166

UNITED STATES PATENT OFFICE

ARTHUR T. KATHNER, OF HOLLIDAYS COVE, WEST VIRGINIA

DISK OR WHEEL FOR CONVEYERS

Application filed January 31, 1927. Serial No. 164,887.

This invention relates broadly to conveyer mechanism, and more specifically to a carry-disk or wheel for conveyers.

The primary object of the invention is to provide an improved form of shaft-carried disk or wheel for conveyers of that type which is employed in furnaces, annealing lehrs and ovens and whereon heated articles, as metal sheets, are carried while being subjected to the action of heat.

A further object is to provide a conveyer disk or wheel for mounting upon a shaft and having a form designed not only to withstand high temperatures without distortion due to warping strains, but also to shield from such high temperatures the shaft by which it is carried, thereby to permit of the employment of shafts in sizes materially smaller than those heretofore used.

A still further object is to provide a conveyer of the character mentioned in which the individual wheels or disks are mounted upon their shafts in interengaged relation and without direct means of attachment to said shafts.

In describing the invention in detail, reference is herein had to the accompanying drawings, in which—

Figure 1 is a view of the invention partly in top plan and partly in section;

Figure 2 is an enlarged side elevation of a conveyer wheel;

Figure 3 is a section on line 3—3, Fig. 2;

Figure 4 is an inner face view of an attaching collar applied to a shaft, the latter being shown in section; and—

Figure 5 is a view similar to Fig. 1, illustrating a modified form of conveyer wheel.

Referring to said drawings, 1 designates generally a hollow cast-metal wheel of unitary construction embodying two hub portions 2 disposed in horizontal axial alinement, walls 3 inclined convergently from said hub portions 1, and a peripheral carrying surface 4 of relatively narrow width disposed parallel to the axis of the wheel. The wheel 1 is designed for mounting upon a rotary shaft 5 in association with other wheels of identical form, as shown in Fig. 1, such shaft and thereby-carried wheels constituting one of a succession of similar units of a conveyer whereon sheets of metal and the like are transported through a furnace or lehr.

The hub portions 2 are preferably formed of materially greater internal diameter than that of the shaft 5 and have a plurality of radial inwardly directed tongues 6 adapted to seat closely upon said shaft, spaces 7 being provided between adjacent tongues. Additionally, each of the hub portions 2 has a dentated outer face, providing alternate tongues 8 and recesses 9 forming clutch elements, it being designed that the clutch elements of each wheel shall interengage those of adjacent wheels for preventing relative rotation of such wheels.

Carried by the shaft 5 in interengaged relation with the endmost wheels 1 borne by the shaft are collars 10, each having its inner face dentated to correspond with the adjacent face of the adjacent hub. Said collars, each of which is rigidly mounted, as by means of a key 11 or a set screw 12, or both, serve to maintain the relatively interengaged carrying wheels 1 in non-rotative relation to the shaft 5.

The interiors of the hollow wheels 1 are preferably filled with a packing 13 consisting of a suitable heat resisting or refractory material, as asbestos fibre or a mixture of infusorial earth, which is introduced through the spaces 7, or through suitably located openings 14 provided in the sides of the wheels. Also, encircling the shaft 5 within the embrace of the interengaged hub projections or tongues 8 is a similar packing 15. Said packings 13 and 15 serve to shield the shaft from the high temperatures of the furnace or lehr.

Obviously, when it becomes necessary to remove one or more of the wheels 1, as for replacement, one of the collars 10 is detached and the wheels are then successively withdrawn until the desired removal has been effected.

In the modification shown in Fig. 5, each wheel $1^a$ comprises a hub $2^a$ of materially greater internal diameter than that of the shaft 5 upon which it is to be carried a pair of internal annular ribs $6^a$ which more or less closely embrace said shaft. The outer end portions of said hub 2ª is dentated to provide separated tongues 8ª which interengage in the manner hereinbefore described with those of adjacent similar hubs. Formed annularly on said hubs is a pair of radially disposed ribs 16 which are relatively spaced to provide an intermediate space 17 adapted to receive therein a similar rib 16 of one of the wheels 1ª carried by an adjacent shaft of the conveyer system.

It will be understood from the foregoing description that the hub portions 2 and 2a with their fingers 8 and 8a constitute a casing surrounding the shaft and defining a space about the latter, and that the annular surfaces, such as 4 on which the articles to be conveyed are supported are of a larger diameter than the casing and are carried by the latter.

Having thus described my invention so that those skilled in the art may be able to practice the same, what I desire to secure by Letters Patent is defined in what is claimed.

What is claimed is—

1. A unitary conveyer wheel comprising a hub having an internal diameter exceeding the diameter of the shaft by which it is to be carried, circumferentially spaced tongue-like members directed radially inward from said hub for resting upon such shaft, and an outwardly extending peripheral portion carried by and having materially greater diameter than said hub.

2. A unitary conveyer wheel comprising a hub having an internal diameter exceeding the diameter of the shaft by which it is to be carried, members directed radially inward from said hub for resting upon such shaft, an outwardly extending peripheral portion carried by said hub, and a heat resisting packing embraced by said hub.

3. A unitary conveyer wheel comprising a hub having an internal diameter exceeding the diameter of the shaft by which it is to be carried, members directed radially inward from said hub for resting upon such shaft, and an outwardly extending peripheral portion carried by said hub, said hub having its outer faces dentated for clutch-like interengagement with the similar hubs of adjacent wheels.

4. A hollow conveyer wheel comprising separated hub portions disposed in axial alinement, and walls inclined convergently from said hub portions and meeting to form a peripheral carrying surface.

5. A hollow conveyer wheel comprising separated hub portions disposed in axial alinement, and walls inclined convergently from said hub portions and meeting to form a peripheral carrying surface, and a packing of heat resisting material within the hollow of said wheel.

6. A hollow conveyer wheel comprising separated hub portions disposed in axial alinement, and walls inclined convergently from said hub portions and meeting to form a peripheral carrying surface, said hubs being adapted to interengage with similar hubs of adjacent wheels for maintaining such wheels against relative rotation.

7. A hollow conveyer wheel comprising separated hub portions disposed in axial alinement, and walls inclined convergently from said hub portions and meeting to form a peripheral carrying surface, said hubs being dentated for clutch-like interengagement with the similar hubs of adjacent wheels.

8. A hollow conveyer wheel comprising separated hub portions disposed in axial alinement, said portions having an internal diameter materially exceeding the diameter of the shaft by which the wheel is to be carried and having radial members directed inwardly to seat upon such shaft, said members being relatively spaced to provide intermediate openings, and walls inclined convergently outward from said hub portions and meeting to form a peripheral carrying surface.

9. A unitary conveyer wheel comprising a hub having an internal diameter exceeding the diameter of the shaft by which it is carried, circumferentially spaced members directed radially inward from said hub for resting upon said shaft, and an outwardly extending peripheral portion carried by said hub.

10. In a conveyer for furnaces, the combination with a rotary shaft, of a plurality of elements surrounding said shaft in end to end relation, positive means for preventing relative rotation of the elements, each of said elements having an internal diameter materially exceeding the outside diameter of said shaft, means disposed about the shaft for maintaining the elements in spaced relation to the shaft to provide a heat insulating space about the shaft, and positive means for preventing relative rotary movement of the shaft and elements.

11. In a conveyer for furnaces, the combination with a rotary shaft, of a plurality of elements surrounding said shaft, each of said elements having an internal diameter materially exceeding the outside diameter of said shaft to provide a heat insulating space about the shaft, means about the shaft for maintaining the elements in spaced relation to the shaft, each of said elements being provided with means for interengaging with the next adjacent element for preventing relative rotary movement thereof, and positive means for preventing relative rotary movement of the shaft and elements.

12. In a conveyer for furnaces, the combination with a rotary shaft, of elements carried by said shaft and having internal diameters materially exceeding the diameter of said shaft, certain of said elements having article carrier means of greater outside diameter than the element, each of said certain elements having means seating on the shaft whereby the element is maintained in spaced relation to the shaft, and driving means for rotating the said certain elements with the shaft.

13. In a conveyer for furnaces, the combination with a rotary shaft, of elements carried by said shaft, certain of said elements having an internal diameter materially exceeding the diameter of said shaft and having article carrier means of greater outside diameter than the element, each of said certain elements having means seating on the shaft whereby the element is maintained in spaced relation to the shaft, the said certain elements interengaging adjacent elements for preventing relative rotary movement thereof, and driving means for rotating the elements with the shaft.

14. In a conveyer for furnaces, the combination with a rotary shaft, of a plurality of elements including hubs carried by said shaft, certain of said elements also including wheels, said hubs having internal diameters materially exceeding the outside diameter of said shaft, each hub having radial, inwardly directed projections seated upon said shaft for maintaining said hub in spaced relation to the latter, and each hub interengaging with adjacent elements for preventing relative rotation.

15. A furnace conveyer assembly including a shaft, a member surrounding and positively driven by the shaft, the shaft and member forming a space therebetween, the said member carrying an annular surface of enlarged diameter to engage with articles to be conveyed, and shaft protecting means in the space.

16. A carrier wheel device comprising a shaft, a plurality of wheels associated therewith, and means surrounding said shaft but spaced therefrom and co-operating with said wheels for operatively connecting the wheels to each other.

17. A carrier wheel device comprising a shaft, a plurality of wheels associated therewith, means surrounding the shaft but spaced therefrom and co-operating with the said wheels for connecting the wheels to each other, and means for connecting the end wheels to the shaft.

18. A furnace roll having hubs formed at opposite ends with projections adapted to engage the adjacent hubs, and spacing means carried by said hubs adapted to engage the surface of an internal supporting member and to define a heat insulating space thereabout.

19. In a furnace, a transverse shaft, and a plurality of sleeves surrounding said shaft and abutting end to end, said sleeves having interengaging projections and recesses adapted to transmit rotation from one to the other, said sleeves abutting in such manner as to produce a substantially complete cover for said shaft, the internal diameter of said sleeves being greater than that of said shaft, and spacing means holding said sleeves concentric with said shaft to define a heat insulating space about the latter.

20. In a furnace, a roll having a hollow hub, a supporting member inside said hub and separated therefrom, and spacing means between said hub and member, said hub being substantially imperforate whereby an air space is produced about said hollow member.

21. In a metallurgical furnace, a shaft, a plurality of work-supporting disks surrounding said shaft, each of said disks being provided with a sleeve surrounding and spaced from said shaft, and insulating material secured between each sleeve and said shaft.

22. A furnace conveyer assembly including a shaft, a member surrounding and positively driven with the shaft, the shaft and member forming a space therebetween, the said member being provided with a plurality of annular surfaces of enlarged diameter to engage with articles to be conveyed, means about the shaft for maintaining the member and shaft in spaced relation, and shaft protecting means in the space.

In testimony whereof, I affix my signature.

ARTHUR T. KATHNER.